United States Patent
Dong

(10) Patent No.: US 10,707,932 B2
(45) Date of Patent: Jul. 7, 2020

(54) MIMO SYSTEM-BASED SIGNAL DETECTION METHOD AND DEVICE, AND STORAGE MEDIUM

(71) Applicant: SANECHIPS TECHNOLOGY CO., LTD., Guangdong (CN)

(72) Inventor: Xuetao Dong, Guangdong (CN)

(73) Assignee: SANECHIPS TECHNOLOGY CO., LTD. (CN)

( * ) Notice: Subject to any disclaimer, the term of this patent is extended or adjusted under 35 U.S.C. 154(b) by 0 days.

(21) Appl. No.: 16/487,866

(22) PCT Filed: Jan. 15, 2018

(86) PCT No.: PCT/CN2018/072586
§ 371 (c)(1),
(2) Date: Nov. 5, 2019

(87) PCT Pub. No.: WO2018/153178
PCT Pub. Date: Aug. 30, 2018

(65) Prior Publication Data
US 2020/0059274 A1    Feb. 20, 2020

(30) Foreign Application Priority Data

Feb. 23, 2017 (CN) .......................... 2017 1 0098805

(51) Int. Cl.
*H04L 7/02* (2006.01)
*H04B 7/0456* (2017.01)
(Continued)

(52) U.S. Cl.
CPC .......... *H04B 7/046* (2013.01); *H04L 1/0054* (2013.01); *H04L 25/03057* (2013.01); *H04L 2025/03426* (2013.01); *H04L 2025/03624* (2013.01)

(58) Field of Classification Search
CPC combination set(s) only.
See application file for complete search history.

(56) References Cited

U.S. PATENT DOCUMENTS

2004/0139137 A1* 7/2004 Mailaender ............. G06F 17/16
708/502
2011/0002414 A1* 1/2011 Coldrey ............... H04B 7/0426
375/296
(Continued)

FOREIGN PATENT DOCUMENTS

| CN | 103997473 A | 8/2014 |
| CN | 104683282 A | 6/2015 |
| CN | 105763493 A | 7/2016 |

OTHER PUBLICATIONS

Qualcomm Incorporated, "PDSCH Demodulation Performance of Enhanced SU-MIMO Receiver UE," 3GPP TSG-RAN WG4 #81 R4-1609709. (Nov. 18, 2016).

(Continued)

*Primary Examiner* — Don N Vo
(74) *Attorney, Agent, or Firm* — McDonald Hopkins LLC

(57) ABSTRACT

Disclosed are a Multiple-Input Multiple-Output (MIMO) system-based signal detection method. The method includes: performing a scaling calculation on a first covariance matrix according to first main diagonal elements in the first covariance matrix to obtain a second covariance matrix; obtaining a whitening matrix according to the second covariance matrix; taking the whitening matrix, a vector of a receiving signal and a channel matrix as input parameters, and inputting the parameters into a mathematical model for a whitening operation and perform a whitening calculation to obtain an operation result; and detecting a transmit signal in a MIMO system according to the operation result to
(Continued)

obtain a detection result. Also disclosed are a MIMO system-based signal detection device and a computer storage medium.

12 Claims, 3 Drawing Sheets

(51) Int. Cl.
*H04L 1/00* (2006.01)
*H04L 25/03* (2006.01)

(56) References Cited

U.S. PATENT DOCUMENTS

| | | |
|---|---|---|
| 2013/0102256 A1 | 4/2013 | Cendrillon et al. |
| 2015/0023443 A1* | 1/2015 | Menon ............. H04L 25/03993 375/267 |
| 2015/0131758 A1* | 5/2015 | Chen ................... H04B 1/1027 375/340 |
| 2017/0324462 A1* | 11/2017 | Chen ....................... H04B 7/08 |

OTHER PUBLICATIONS

Zhang, "A RIS-based Subspace Channel Estimation for MIMO Virtual Carrier OFDM Systems," Telecommunications and Signal Processing (TSP) 39th International Conference. (Nov. 1, 2016).
Translation of International Search Report, dated Mar. 27, 2018; International Patent Application No. PCT/CN2018/072586 filed on Jan. 15, 2018.

* cited by examiner

MIMO SYSTEM-BASED SIGNAL DETECTION METHOD AND DEVICE, AND STORAGE MEDIUM

CROSS-REFERENCES TO RELATED APPLICATIONS

This application is a U.S. National Stage Application, filed under 35 U.S.C. 371, of International Patent Application No. PCT/CN2018/072586, filed on Jan. 15, 2018, which claims priority to Chinese patent application No. 201710098805.8 filed on Feb. 23, 2017, the disclosures of which are incorporated herein by reference in their entireties.

TECHNICAL FIELD

The present disclosure relates to a signal detection technology, and in particular, to a signal detection method and device based on a Multiple-Input Multiple-Output (MIMO) system, and a computer storage medium.

BACKGROUND

In a Long Term Evolution-Advanced (LTE-A) system, especially in the 3rd Generation Partnership Project (3GPP) R12/R13 specification, heterogeneous networks are more and more important, and microcells are more and more densely deployed. Such increasingly dense deployment of microcells causes a User Equipment (UE) to face increasingly strong macrocell interference or microcell interference at the edge of the microcell. From the 3GPP R12 specification, a terminal is first required to support a receiving algorithm of Network Assistant Interference Cancellation and Suppression (NAICS), a typical NAICS receiver is only able to solve one strong-interference adjacent cell, and other adjacent cells are regarded as random interference.

In the existing art, the UE detects a transmit signal in the MIMO system by using a receiving signal, a channel estimation, and an interference noise covariance matrix.

Specifically, a system equation for the receiving signal is: Y=HX+N, where Y is a receiving signal vector, H is a channel matrix, X is a transmit symbol vector, and N is an interference noise vector. Here, the interference noise vector includes two parts: interference and white noise. For the NAICS system, the channel and the transmit symbol of the solved strong-interference adjacent cell are equivalently and respectively included in H and X, and interference of other cells is embodied in N.

R is defined as the interference noise covariance matrix, i.e., $R=E(NN^H)$, where R is a positive definite Hermitian matrix and H in $NN^H$ denotes a complex conjugate transpose matrix. Here, the UE may estimate a parameter value of R by various methods.

In the existing art, detection on a signal of the UE and detection on a parameter of an adjacent cell in the NAICS are generally performed by using algorithms such as Zero Forcing (ZF), Minimum Mean Square Error (MMSE), Maximum Likelihood (ML), and Reduced Maximum Likelihood (R-ML) (including Sphere decoding (SD)), and these algorithms are only suitable for the case where R=k*I, where k is a real constant coefficient and denotes white noise power, and I is a unit matrix. Details are shown in FIG. 1.

FIG. 1 is a schematic diagram illustrating an implementation process of signal detection.

As shown in FIG. 1, k, Y and H are inputted, the estimation $\hat{X}$ of X is obtained through the algorithms such as ZF, MMSE and R-ML (including SD) in a detection unit, and a parameter estimation corresponding to the adjacent cell is obtained in the NAICS parameter blind detection.

When interference from an adjacent cell exists, R no longer satisfies the property of (k*I), and for the MMSE algorithm, MMSE-Interference Rejection Combining (MMSE-IRC) may be used for detection, while other algorithms cannot be used for effective interference rejection. Then, a whitening matrix W is required to whiten the system equation, i.e., WY=WHX+WN, and then the system equation is equivalently transformed into: $Y_w=H_w X+N_w$, where $Y_w=WY$ and $H_w=WH$, and the whitened covariance matrix $R_w$ is: $R_w=E(N_w N_w^H)=WRW^H$.

W is suitably chosen so that $R_w$ has the form of (k*I). Examples are described below.

(a) $W=R^{-1/2}$.

(b) Cholesky decomposition is performed on $R^{-1}$, $R^{-1}=U^H \cdot U$, where U is an upper triangular matrix, and W=U.

(c) Cholesky decomposition is performed on R, $R=L \cdot L^H$, where L is a lower triangular matrix, and $W=L^{-1}$.

$R_w$ may have the form of (k*I) by using any one of the above three types of W (not limited to the three types) in (a), (b), and (c). The form (c) is commonly used in the industry since the lower triangular matrix is more convenient for inversion. The form (c) is taken as an example for demonstration.

$W=L^{-1}$ is substituted into a whitened covariance matrix $R_w$, and then $R_w=WRW^H=L^{-1}RL^{-H}=L^{-1} \cdot L \cdot L^H L^{-H}=I=1 \cdot I$.

The demonstration shows that $R_w$, being whitened, has the form of (k*I), and that k is further a constant "1", and the same results may be demonstrated for (a) and (b). Therefore, with adding only one whitening unit, the UE can use the original various detection algorithms, and details are shown in FIG. 2.

FIG. 2 is a schematic diagram illustrating an implementation process of signal detection through a whitening matrix.

As shown in FIG. 2, a whitening matrix W is obtained through a covariance matrix R, then the whitening matrix W and Y and H in a system equation are used as input of a whitening unit, a whitening calculation is performed on the Y and the H to obtain whitened $Y_W$ and whitened $H_W$, the Whitened $Y_W$ and Whitened $H_W$ are Detected Through Algorithms Such as ZF, MMSE and R-ML (including SD) in a detection unit to obtain the estimation $\hat{X}$ of X, and the parameter estimation corresponding to an adjacent cell is obtained in the NAICS parameter blind detection process.

FIG. 2 shows that k is always a fixed constant "1", which refers to that interference noise is eventually equivalent to a white noise level of "1" no matter how large the interference noise is. When the UE is in an environment with very low interference noise, interference noise power is very low, and through whitening, Y and H are amplified by many times in value and become $Y_W$ and $H_W$. When the UE is in an environment with big interference noise, the interference noise power is large, and Y and H are reduced through whitening by many times in numerical value and become $Y_W$ and $H_W$, so that $Y_W$ and $H_W$ changes greatly and the changing ranges need a large bit width for representation, and the area of the detection unit performing signal detection through ZF, MMSE and R-ML algorithms (including SD) is greatly increased. Meanwhile, a frequent change of the interference environment directly causes a large numerical range of R, so that an area in the process of calculating the whitening matrix W through the covariance matrix R is relatively large.

SUMMARY

In order to solve the existing technical problems, embodiments of the present disclosure expect to provide a signal detection method and device based on a MIMO system, and a computer storage medium, which can reduce a bit width and an area of a digital model for a whitening operation.

Technical solutions of the present disclosure are implemented as follows.

In an aspect of the embodiments of the present disclosure, a signal detection method based on a MIMO system is provided. The method includes steps described below. A scaling calculation is performed on a first covariance matrix according to first main diagonal elements in the first covariance matrix to obtain a second covariance matrix.

A whitening matrix is obtained according to the second covariance matrix.

The whitening matrix, a vector of a receiving signal and a channel matrix are taken as input parameters, and the input parameters are inputted into a mathematical model for a whitening operation to perform a whitening calculation to obtain an operation result.

A transmit signal in the MIMO system is detected according to the operation result to obtain a detection result.

In the above solution, the step in which the scaling calculation is performed on the first covariance matrix according to the first main diagonal elements in the first covariance matrix to obtain the second covariance matrix includes steps described below.

A first scaling factor is obtained according to the first main diagonal elements in the first covariance matrix, and a second scaling factor is obtained by quantizing the first scaling factor into a power of 2.

The scaling calculation is performed on the first covariance matrix according to the first scaling factor or the second scaling factor to obtain the second covariance matrix. It is to be noted that: the first scaling factor may be quantized to obtain the second scaling factor for use, and may also be used directly without being quantized to the second scaling factor, that is, directly using the first scaling factor is not excluded.

In the above solution, the first scaling factor is a mean value, a maximum value, or a minimum value of the first main diagonal elements.

In the above solution, the step in which the transmit signal in the MIMO system is detected according to the operation result to obtain the detection result includes a step described below.

The transmit signal in the MIMO system is detected and calculated according to the operation result through a ZF algorithm, an MMSE algorithm or an R-ML algorithm to obtain the detection result.

In another aspect of the embodiments of the present disclosure, a signal detection device based on a MIMO system is provided.

The device includes: a scaling unit, a whitening unit and a detection unit.

The scaling unit is configured to perform a scaling calculation on a first covariance matrix according to first main diagonal elements in the first covariance matrix to obtain a second covariance matrix.

The whitening unit is configured to obtain a whitening matrix according to the second covariance matrix obtained from the scaling unit; and take the whitening matrix, a vector of a receiving signal and a channel matrix as input parameters, and input the input parameters into a mathematical model for a whitening operation to perform a whitening calculation to obtain an operation result.

The detection unit is configured to detect a transmit signal in the MIMO system according to the operation result obtained from the whitening unit to obtain a detection result.

In the above solution, the scaling unit is further configured to obtain a first scaling factor according to the first main diagonal elements in the first covariance matrix, and quantize the first scaling factor into a power of 2 to obtain a second scaling factor; and perform the scaling calculation on the first covariance matrix according to the first scaling factor or the second scaling factor to obtain the second covariance matrix. It is to be noted that: the first scaling factor may be quantized to the second scaling factor for use, and may also be used directly without being quantized to the second scaling factor, that is, directly using the first scaling factor is not excluded.

In the above solution, the first scaling factor is a mean value, a maximum value, or a minimum value of the first main diagonal elements.

In the above solution, the detection unit is further configured to detect and calculate the transmit signal in the MIMO system according to the operation result through a ZF algorithm, an MMSE algorithm or an R-ML algorithm to obtain the detection result.

When performing the processing, the scaling unit, the whitening unit and the detection unit may be implemented by a Central Processing Unit (CPU), a Digital Signal Processor (DSP) or a Field-Programmable Gate Array (FPGA).

A computer storage medium is further provided in the embodiments of the present disclosure, and is configured to store computer-executable instructions for executing the signal detection method based on the MIMO system described above.

The signal detection method and device based on the MIMO system are provided in the embodiments of the present disclosure. The scaling calculation is performed on the first covariance matrix according to the first main diagonal elements in the first covariance matrix to obtain the second covariance matrix. The whitening matrix is obtained according to the second covariance matrix. The whitening matrix, the vector of a receiving signal and the channel matrix are taken as input parameters, and the input parameters are inputted into the mathematical model for the whitening operation to perform the whitening calculation to obtain the operation result. The transmit signal in the MIMO system is detected according to the operation result to obtain the detection result. Therefore, the scaling calculation is performed on the covariance matrix through the main diagonal element in the covariance matrix, and the covariance matrix is subjected to normalization processing, so that the values in the scaled covariance matrix are concentrated and are not diverged any more, and the bit width and the area of a digital model for the whitening operation are reduced. In addition, the first scaling factor is converted into a power of 2, so that the division operation is changed into a shift operation, and resources are further saved.

DETAILED DESCRIPTION

Specific embodiments of the present disclosure will be described below in detail with reference to the drawings. It is to be understood that the embodiments described below are intended to explain and not to limit the present disclosure.

Figure 1:
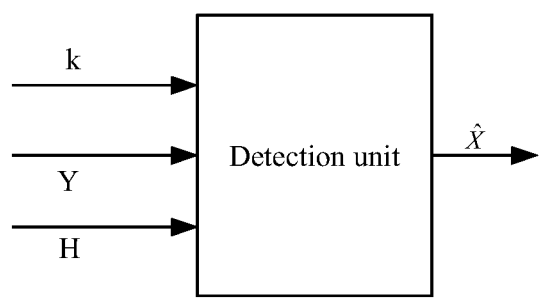
FIG. 1 is a schematic diagram illustrating an implementation process of signal detection.
Figure 2:
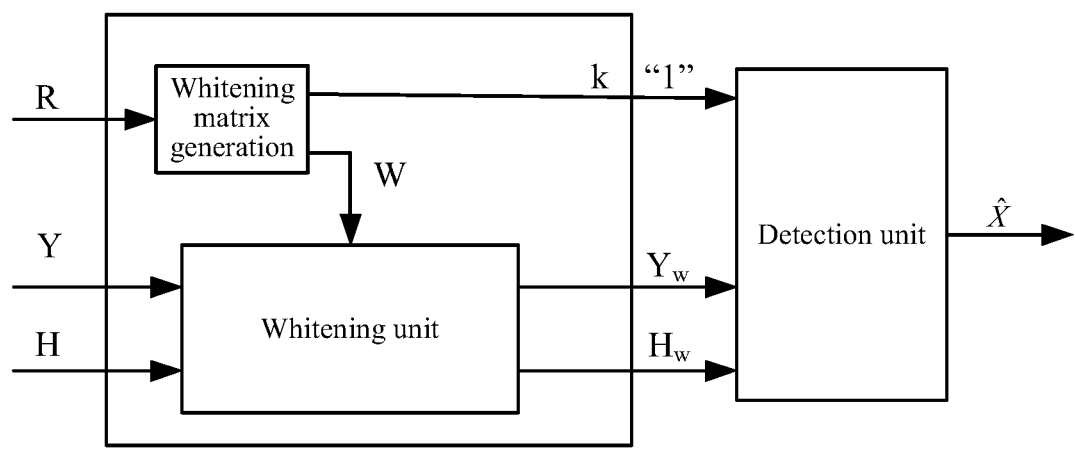
FIG. 2 is a schematic diagram illustrating an implementation process of signal detection through a whitening matrix.
Figure 3:
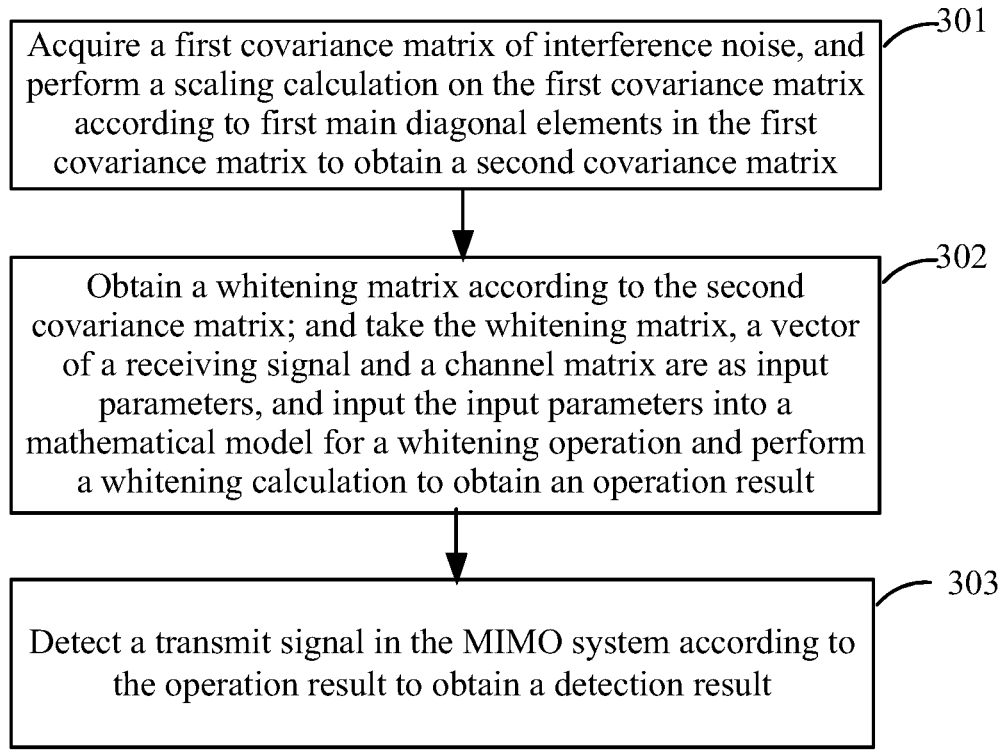
FIG. 3 is a flowchart illustrating implementation of a signal detection method based on a MIMO system according to an embodiment of the present disclosure.

FIG. 3 is a flowchart of a signal detection method based on a MIMO system according to an embodiment of the present disclosure. As shown in FIG. 3, the method includes steps described below.

In step 301, a first covariance matrix of interference noise is acquired, and a scaling calculation is performed on the first covariance matrix according to the first main diagonal elements in the first covariance matrix to obtain a second covariance matrix.

Here, the method is mainly applied to a MIMO system, a first covariance matrix R is a positive definite Hermitian matrix, a scaling calculation is performed on the first covariance matrix according to the mean value, the maximum value or the minimum value of the first main diagonal elements in the first covariance matrix to obtain the second covariance matrix, the normalization processing of the first covariance matrix can be implemented, and the values of the obtained second covariance matrix are concentrated and are not diverging any more, so that the bit width is reduced.

In step 302, a whitening matrix is obtained according to the second covariance matrix; and the whitening matrix, a vector of a receiving signal and a channel matrix are taken as input parameters, and the input parameters are inputted into a mathematical model for a whitening operation to perform a whitening calculation to obtain an operation result.

Here, specifically, a whitening matrix W is obtained according to the second covariance matrix, the whitening matrix W, a vector Y of the receiving signal and a channel matrix H are taken as input parameters, and the input parameters are inputted into a digital model for the whitening operation to perform the whitening calculation to obtain whitened $Y_W$ and $H_W$.

In step 303, a transmit signal in the MIMO system is detected according to the operation result to obtain a detection result.

Here, the transmit signal in the MIMO system is detected and calculated according to the whitened $Y_W$ and $H_W$ through a ZF algorithm, an MMSE algorithm or an R-ML algorithm to obtain the detection result.

Figure 4:
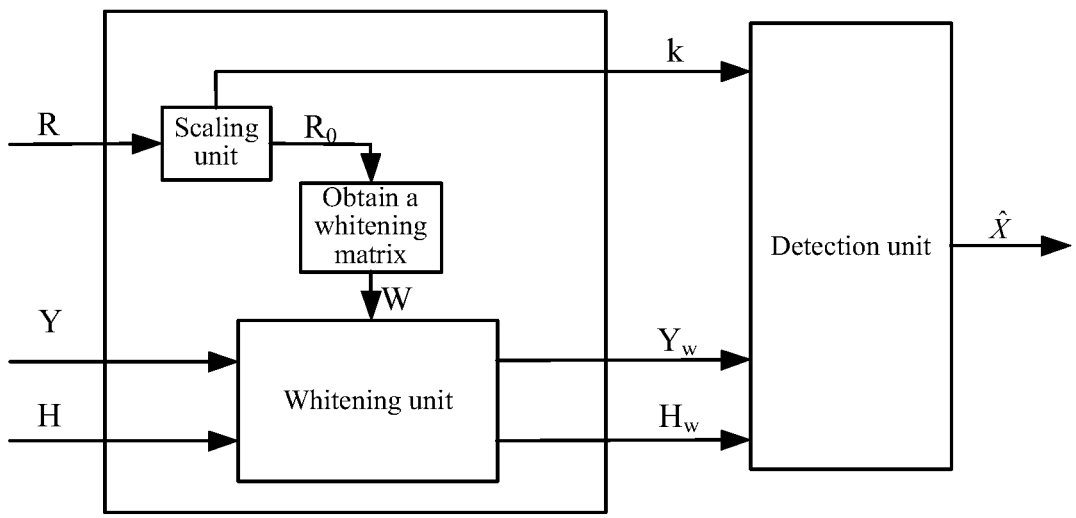
FIG. 4 is a schematic flowchart of detecting a transmit signal in a MIMO system according to an embodiment of the present disclosure.

FIG. 4 is a schematic flowchart illustrating implementation of detecting a transmit signal in a MIMO system according to an embodiment of the present disclosure.

As shown in FIG. 4, Cholesky decomposition is performed on R, $R = L \cdot L^H$, where L is a lower triangular matrix, and $w = L^{-1}$ is taken as an example, and a scaling calculation is performed on R through a scaling unit to obtain $R_0$, where $$R_0 = \frac{1}{k} R.$$

Then, $R_0$ is used to obtain a whitening matrix W, $R_0 = L_0 \cdot L_0^H$, $R_0^{-1} = L_0^{-H} \cdot L_0^{-1}$, let $W = L_0^{-1}$, and then $R_w = W R W^H = L_0^{-1} k R_0 L_0^{-H} = k L_0^{-1} L_0 \cdot L_0^H L_0^{-H} = k \cdot I$.

Then, a proper value of a first scaling factor k is selected according to a main diagonal element of R. The whitening matrix W, a vector Y of a receiving signal and a channel matrix H are taken as input parameters of a whitening unit. The input parameters are inputted into a mathematical model for a whitening operation to perform a whitening calculation to obtain an operation result. Then, a detection unit detects and calculates the transmit signal in the MIMO system according to the operation result through a ZF algorithm, an MMSE algorithm or an R-ML algorithm to obtain a detection result. Specifically, the value of k is selected according to the main diagonal element of R as shown in FIG. 5.

Figure 5:
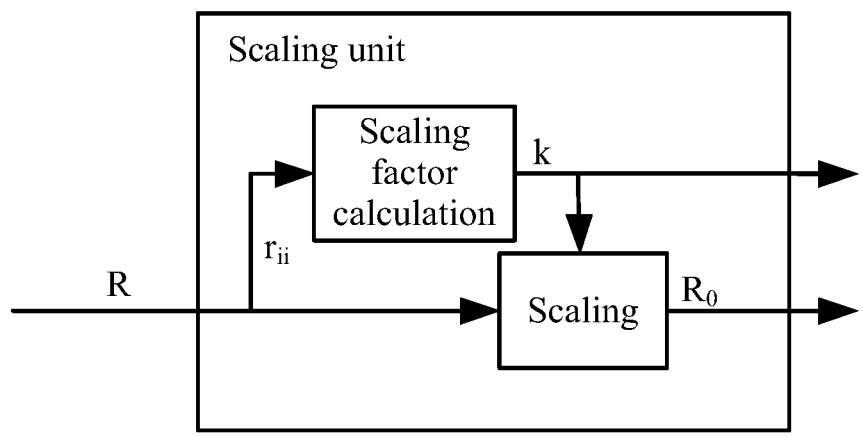
FIG. 5 is a schematic flowchart illustrating a specific implementation of performing a scaling calculation on R by using a scaling unit according to an embodiment of the present disclosure.

FIG. 5 is a schematic flowchart of a specific implementation of a scaling calculation on R by using a scaling unit according to an embodiment of the present disclosure.

As shown in FIG. 5, a main diagonal element $r_{ii}$ of R is used as an input for calculating the first scaling factor, for example, the first scaling factor k is set to be the mean value, the maximum value or the minimum value of the main diagonal element of R, but the present disclosure is not limited to this method, and includes all methods for obtaining the value of the first scaling factor k based on the main diagonal element, such as appropriate scaling, so that the normalization effect on R is achieved, and the obtained values of $R_0$ are concentrated and are not diverging any more. Thus, the bit width is reduced, and the area of the module for calculating the whitening matrix is reduced. Meanwhile, k is not a fixed value "1" any more and does not change greatly in magnitude compared with the original interference noise, so that the numerical ranges of $Y_w$ and $H_w$ also do not change greatly, the bit widths of the ZF, MMSE and R-ML (including SD) units do not need to be increased, and the area for implementing signal detection is optimized.

In the embodiment of the present disclosure, the step in which the scaling calculation is performed on the first covariance matrix according to the first main diagonal elements in the first covariance matrix to obtain the second covariance matrix includes steps described below.

A first scaling factor is obtained according to the first main diagonal elements in the first covariance matrix, and a second scaling factor is obtained by quantizing the first scaling factor into a power of 2.

The scaling calculation is performed on the first covariance matrix according to the second scaling factor to obtain the second covariance matrix.

Here, the first scaling factor k may be quantized, specifically, the first scaling factor may be a mean value, a maximum value, or a minimum value and other values of the first main diagonal elements of R, and then a power of 2 whose value is closest thereto is used as the second scaling factor k, i.e., $k = 2^m$, where m is an integer. This allows the division operation in $$R_0 = \frac{1}{k} R$$

to be replaced by a shift operation which does not consume resources, that is, $R_0=2^{-m}\cdot R$. For example:

$$Y = \begin{bmatrix} 0.59 + j0.055 \\ 1.28 - j1.142 \end{bmatrix};$$

$$H = \begin{bmatrix} -0.46 + j0.46 & -0.58 + j0.03 \\ -0.97 + j0.128 & 0.588 + j0.3 \end{bmatrix};$$

$$R = \begin{bmatrix} 0.011133 & 0.0154 + j0.005 \\ 0.0154 - j0.005 & 0.03185 \end{bmatrix};$$

(1) If R is not subjected to the scaling calculation, but is directly subjected to the whitening calculation, after R is subjected to cholesky decomposition, $R=L\cdot L^H$, $$L = \begin{bmatrix} 0.1055 & 0 \\ 0.14595 - j0.04739 & 0.09112 \end{bmatrix}.$$

A whitening matrix is obtained:

$$W = L^{-1} = \begin{bmatrix} 9.477 & 0 \\ -15.18 + j4.928 & 10.9744 \end{bmatrix}.$$

According to the above equation, the value of W is very large, and needs a large number of integer bits, so that the bit width becomes large.

Y and H are whitened to obtain:

$$Y_w = W \cdot Y = \begin{bmatrix} 9.477 & 0 \\ -15.18 + j4.928 & 10.9744 \end{bmatrix}$$
$$\begin{bmatrix} 0.59 + j0.055 \\ 1.28 - j1.142 \end{bmatrix} = \begin{bmatrix} 5.59 + j0.52 \\ 4.82 - j10.46 \end{bmatrix}; \text{ and}$$

$$H_w = W \cdot H = \begin{bmatrix} 9.477 & 0 \\ -15.18 + j4.928 & 10.9744 \end{bmatrix}$$
$$\begin{bmatrix} -0.46 + j0.46 & -0.58 + j0.03 \\ -0.97 + j0.128 & 0.588 + j0.3 \end{bmatrix}$$
$$= \begin{bmatrix} -4.36 + j4.36 & -5.497 + j0.284 \\ -5.93 - j7.845 & 15.11 - j0.216 \end{bmatrix}.$$

It may be seen that $Y_w$ and $H_w$ are much larger than the original Y and H respectively, and need more integer bits, thereby increasing the bit width and increasing the area of the detection unit.

(2) R is scaled by using the mean value of the main diagonal element of R.

$$k = (0.013 + 0.03185)/2 = 0.0215$$

$$R_0 = \frac{1}{k}R = \frac{1}{0.0215} \times$$
$$\begin{bmatrix} 0.011133 & 0.0154 + j0.005 \\ 0.0154 - j0.005 & 0.03185 \end{bmatrix}$$
$$= \begin{bmatrix} 0.518 & 0.717 + j0.233 \\ 0.717 - j0.233 & 1.482 \end{bmatrix}.$$

Cholesky decomposition is performed on $R_0$, $R_0=L_0 \cdot L_0^H$, and $$L_0 = \begin{bmatrix} 0.72 & 0 \\ 1 - j0.323 & 0.622 \end{bmatrix}.$$

The following whitening matrix is obtained:

$$W = L_0^{-1} = \begin{bmatrix} 1.39 & 0 \\ -2.225 + j0.723 & 1.61 \end{bmatrix}.$$

As shown above, the range of W is narrowed down. It is be noted that the whitening unit for calculating W is also implemented by a circuit, and the bit width for calculating W is also greatly reduced due to the concentrated range of $R_0$, thereby reducing the area of the whitening unit for calculating W.

$$Y_w = W \cdot Y = \begin{bmatrix} 1.39 & 0 \\ -2.225 + j0.723 & 1.61 \end{bmatrix}$$
$$\begin{bmatrix} 0.59 + j0.055 \\ 1.28 - j1.142 \end{bmatrix} = \begin{bmatrix} 0.82 + j0.076 \\ 0.707 - j1.533 \end{bmatrix}; \text{ and}$$

$$H_w = W \cdot H = \begin{bmatrix} 1.39 & 0 \\ -2.225 + j0.723 & 1.61 \end{bmatrix}$$
$$\begin{bmatrix} -0.46 + j0.46 & -0.58 + j0.03 \\ -0.97 + j0.128 & 0.588 + j0.3 \end{bmatrix}$$
$$= \begin{bmatrix} -0.64 + j0.64 & -0.801 + j0.04 \\ -0.87 - j1.15 & 2.215 - j0.003 \end{bmatrix}.$$

As shown above, compared with non-scaled R, the scaled R does not make $Y_w$ and $H_w$ to become abnormally large, and the ranges of $Y_w$ and $H_w$ are basically the same as the ranges of original Y and H respectively, so that when the subsequent detection unit performs signal detection through algorithms such as ZF, MMSE and R-ML (including SD), the bit width may be used without adjustment.

In one embodiment of the present disclosure, the first scaling factor k is quantized into a power of 2 to obtain the second scaling factor, k=0.0215, and then the power of 2 whose value is closest to the second scaling factor k is $2=0.015625$. Therefore, the scaling process of R can be further simplified by actually using $k=2^{-6}=0.015625$, and the shift operation is used to replace the division operation, greatly reducing the area of the detection unit.

$$R_0 = \frac{1}{k}R = \frac{1}{2^{-6}} \times$$
$$\begin{bmatrix} 0.011133 & 0.0154 + j0.005 \\ 0.0154 - j0.005 & 0.03185 \end{bmatrix}$$
$$= \begin{bmatrix} 0.7125 & 0.9856 + j0.32 \\ 0.9856 - j0.32 & 2.0384 \end{bmatrix}.$$

Cholesky decomposition is performed on $R_0$, $R_0=L_0 \cdot L_0^H$, and $$L_0 = \begin{bmatrix} 0.844 & 0 \\ 1.1676 - j0.38 & 0.729 \end{bmatrix}.$$

The following whitening matrix is obtained.

$$W = L_0^{-1} = \begin{bmatrix} 1.1847 & 0 \\ -1.8975 + j0.616 & 1.372 \end{bmatrix}.$$

The whitening matrix W, a vector Y of a receiving signal and a channel matrix H are taken as input parameters, and the input parameters are inputted into a mathematical model for a whitening operation to perform a whitening calculation.

$$Y_w = W \cdot Y = \begin{bmatrix} 1.1847 & 0 \\ -1.8975 + j0.616 & 1.372 \end{bmatrix}$$
$$\begin{bmatrix} 0.59 + j0.055 \\ 1.28 - j1.142 \end{bmatrix} = \begin{bmatrix} 0.699 + j0.065 \\ 0.6025 - j1.307 \end{bmatrix}; \text{ and}$$

$$H_w = W \cdot H = \begin{bmatrix} 1.1847 & 0 \\ -1.8975 + j0.616 & 1.372 \end{bmatrix}$$
$$\begin{bmatrix} -0.46 + j0.46 & -0.58 + j0.03 \\ -0.97 + j0.128 & 0.588 + j0.3 \end{bmatrix}$$
$$= \begin{bmatrix} -0.545 + j0.545 & -0.687 + j0.036 \\ -0.741 - j0.98 & 1.889 - j0.0027 \end{bmatrix}.$$

As show above, the range of W is narrowed. It is be noted that the whitening unit for calculating W is also implemented by a circuit, and the bit width of the process in which the whitening unit calculates W is also greatly reduced due to the concentrated range of $R_0$, thereby reducing the area of the whitening unit for calculating W.

Figure 6:
FIG. 6 is a schematic structural diagram of a signal detection device based on a MIMO system according to an embodiment of the present disclosure.

FIG. 6 is a schematic structural diagram of a signal detection device based on a MIMO system according to an embodiment of the present disclosure. As shown in FIG. 6, the device includes: a scaling unit 601, a whitening unit 602 and a detection unit 603.

The scaling unit 601 is configured to perform a scaling calculation on a first covariance matrix according to first main diagonal elements in the first covariance matrix to obtain a second covariance matrix.

The whitening unit 602 is configured to obtain a whitening matrix according to the second covariance matrix obtained from the scaling unit 601; and take the whitening matrix, a vector of a receiving signal and a channel matrix as input parameters, and input the input parameters into a mathematical model for a whitening operation to perform a whitening calculation to obtain an operation result.

The detection unit 603 is configured to detect a transmit signal in the MIMO system according to the operation result obtained from the whitening unit 602 to obtain a detection result.

Here, specifically, a first covariance matrix of interference noise is defined by the scaling unit 601, the first covariance matrix R is a positive definite Hermitian matrix, and the scaling calculation is performed on the first covariance matrix according to a mean value, a maximum value, or a minimum value of the first main diagonal elements in the first covariance matrix to obtain the second covariance matrix. The normalization processing of the first covariance matrix can be implemented, and values of the obtained second covariance matrix are concentrated and are not diverging any more, so that the bit width is reduced.

Then, a whitening matrix W is obtained by the whitening unit 602 according to the second covariance matrix, the whitening matrix W, a vector Y of the receiving signal and a channel matrix H are taken as input parameters, and the input parameters are inputted into a digital model for the whitening operation to perform the whitening calculation to obtain whitened YW and HW.

Then, the detection unit 603 detects and calculates the transmit signal in the MIMO system through a ZF algorithm, an MMSE algorithm or an R-ML algorithm according to the whitened $Y_W$ and $H_W$ to obtain a detection result. Specifically, for the implementation flow of detecting the transmit signal in the MIMO system, reference may be made to description of FIG. 4.

In the embodiment of the present disclosure, the scaling unit 601 is further configured to obtain a first scaling factor according to the first main diagonal elements in the first covariance matrix, and quantize the first scaling factor into a second scaling factor in the form of a power of 2; and perform the scaling calculation on the first covariance matrix according to the second scaling factor to obtain the second covariance matrix. Specifically, for a specific implementation flow of performing the scaling calculation on R by using the scaling unit 601, reference may be made to description of FIG. 5. In this way, the division operation in the covariance matrix is replaced by a shift operation, and resources are reduced.

It is to be understood by those skilled in the art that the embodiments of the present disclosure may be provided as methods, systems, or computer program products. Therefore, the present disclosure may adopt a form of a hardware embodiment, a software embodiment, or a combination of hardware and software embodiments. In addition, the present disclosure may adopt a form of a computer program product implemented on one or more computer-usable storage media (including, but not limited to, a disk memory, an optical memory and the like) which include computer-usable program codes.

The present disclosure is described with reference to flowcharts and/or block diagrams of methods, devices (systems) and computer program products according to the embodiments of the present disclosure. It is to be understood that computer program instructions implement each flow and/or block in the flowcharts and/or block diagrams and a combination of flows and/or blocks in the flowcharts and/or block diagrams. These computer program instructions may be provided for a processor of a general purpose computer, a special purpose computer, an embedded processor or another programmable data processing device to produce a machine, so that instructions, which are executed via the processor of the computer or another programmable data processing device, create a means for implementing one or more flows in the flowcharts or the functions specified in one or more blocks in the block diagrams.

These computer program instructions may also be stored in a computer-readable memory which is able to direct a computer or another programmable data processing device to operate in a particular manner, so that the instructions stored in the computer-readable memory produce an article of manufacture including instruction means which implement the function specified in one or more flows in the flowcharts and/or one or more blocks in the block diagrams.

These computer program instructions may also be loaded onto a computer or another programmable data processing device to cause a series of operational steps to be executed on the computer or another programmable device to produce a computer implemented process so that the instructions executed on the computer or another programmable device provide steps for implementing one or more flows in the flowcharts and/or the functions specified in one or more blocks in the block diagrams.

The above are only preferred embodiments of the present disclosure and are not intended to limit the scope of the present disclosure.

INDUSTRIAL APPLICABILITY

With the embodiments of the present disclosure, the scaling calculation is performed on the first covariance matrix according to the first main diagonal elements in the first covariance matrix to obtain the second covariance matrix. The whitening matrix is obtained according to the second covariance matrix. The whitening matrix, the vector of a receiving signal and the channel matrix are taken as input parameters, and the input parameters are inputted into the mathematical model for the whitening operation to perform the whitening calculation to obtain the operation result. The transmit signal in the MIMO system is detected according to the operation result to obtain the detection result. Therefore, the scaling calculation is performed on the covariance matrix through the main diagonal element in the covariance matrix, and the covariance matrix is subjected to normalization processing, so that the values in the scaled covariance matrix are concentrated and are not diverging any more, and the bit width and the area of a digital model for the whitening operation are reduced. In addition, the first scaling factor is converted into a power of 2, so that the division operation is changed into a shift operation, reducing resources.

What is claimed is:

1. A signal detection method based on a Multiple-Input Multiple-Output (MIMO) system, comprising:
    performing a scaling calculation on a first covariance matrix according to first main diagonal elements in the first covariance matrix to obtain a second covariance matrix;
    obtaining a whitening matrix according to the second covariance matrix;
    taking the whitening matrix, a vector of a receiving signal and a channel matrix as input parameters, and inputting the input parameters into a mathematical model for a whitening operation and perform a whitening calculation to obtain an operation result; and
    detecting a transmit signal in the MIMO system according to the operation result to obtain a detection result.

2. The method of claim 1, wherein performing the scaling calculation on the first covariance matrix according to the first main diagonal elements in the first covariance matrix to obtain the second covariance matrix comprises:
    obtaining a first scaling factor according to the first main diagonal elements in the first covariance matrix, and obtaining a second scaling factor by quantizing the first scaling factor into a power of 2; and
    performing the scaling calculation on the first covariance matrix according to the first scaling factor or the second scaling factor to obtain the second covariance matrix.

3. The method of claim 2, wherein the first scaling factor is a mean value, a maximum value, or a minimum value of the first main diagonal elements.

4. The method of claim 1, wherein detecting the transmit signal in the MIMO system according to the operation result to obtain the detection result comprises:
    detecting and calculating the transmit signal in the MIMO system according to the operation result through a Zero Forcing (ZF) algorithm, a Minimum Mean Square Error (MMSE) algorithm or a Reduced Maximum Likelihood (R-ML) algorithm to obtain the detection result.

5. A non-transitory computer storage medium, which is configured to store computer-executable instructions for executing signal detection method based on a MIMO, wherein the signal detection method comprises:
    performing a scaling calculation on a first covariance matrix according to first main diagonal elements in the first covariance matrix to obtain a second covariance matrix;
    obtaining a whitening matrix according to the second covariance matrix;
    taking the whitening matrix, a vector of a receiving signal and a channel matrix as input parameters, and inputting the input parameters into a mathematical model for a whitening operation and perform a whitening calculation to obtain an operation result; and
    detecting a transmit signal in the MIMO system according to the operation result to obtain a detection result.

6. The computer storage medium of claim 5, wherein performing the scaling calculation on the first covariance matrix according to the first main diagonal elements in the first covariance matrix to obtain the second covariance matrix comprises:
    obtaining a first scaling factor according to the first main diagonal elements in the first covariance matrix, and obtaining a second scaling factor by quantizing the first scaling factor into a power of 2; and
    performing the scaling calculation on the first covariance matrix according to the first scaling factor or the second scaling factor to obtain the second covariance matrix.

7. The computer storage medium of claim 6, wherein the first scaling factor is a mean value, a maximum value, or a minimum value of the first main diagonal elements.

8. The computer storage medium of claim 5, wherein detecting the transmit signal in the MIMO system according to the operation result to obtain the detection result comprises:
    detecting and calculating the transmit signal in the MIMO system according to the operation result through a Zero Forcing (ZF) algorithm, a Minimum Mean Square Error (MMSE) algorithm or a Reduced Maximum Likelihood (R-ML) algorithm to obtain the detection result.

9. A signal detection device based on a Multiple-Input Multiple-Output (MIMO) system comprising:
    a processor; and
    a memory communicably connected to the processor for storing instructions executable by the processor,
    wherein execution of the instructions by the processor cause the processor to execute a signal detection method, wherein the signal detection method comprises:
    performing a scaling calculation on a first covariance matrix according to first main diagonal elements in the first covariance matrix to obtain a second covariance matrix;
    obtaining a whitening matrix according to the second covariance matrix;
    taking the whitening matrix, a vector of a receiving signal and a channel matrix as input parameters, and inputting the input parameters into a mathematical model for a whitening operation and perform a whitening calculation to obtain an operation result; and
    detecting a transmit signal in the MIMO system according to the operation result to obtain a detection result.

10. The signal detection device of claim 9, wherein performing the scaling calculation on the first covariance matrix according to the first main diagonal elements in the first covariance matrix to obtain the second covariance matrix comprises:
    obtaining a first scaling factor according to the first main diagonal elements in the first covariance matrix, and obtaining a second scaling factor by quantizing the first scaling factor into a power of 2; and
    performing the scaling calculation on the first covariance matrix according to the first scaling factor or the second scaling factor to obtain the second covariance matrix.

11. The signal detection device of claim 10, wherein the first scaling factor is a mean value, a maximum value, or a minimum value of the first main diagonal elements.

12. The signal detection device of claim 9, wherein detecting the transmit signal in the MIMO system according to the operation result to obtain the detection result comprises:
    detecting and calculating the transmit signal in the MIMO system according to the operation result through a Zero Forcing (ZF) algorithm, a Minimum Mean Square Error (MMSE) algorithm or a Reduced Maximum Likelihood (R-ML) algorithm to obtain the detection result.

\* \* \* \* \*